United States Patent
Wu

(10) Patent No.: US 10,980,056 B2
(45) Date of Patent: Apr. 13, 2021

(54) METHODS AND APPARATUSES FOR SKIPPING TRANSPORT BLOCK TRANSMISSION DEPENDING ON UPLINK CONTROL INFORMATION TRANSMISSION

(71) Applicant: Nokia Technologies Oy, Espoo (FI)

(72) Inventor: Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/099,421

(22) PCT Filed: May 4, 2017

(86) PCT No.: PCT/FI2017/050343
§ 371 (c)(1),
(2) Date: Nov. 6, 2018

(87) PCT Pub. No.: WO2017/194830
PCT Pub. Date: Nov. 16, 2017

(65) Prior Publication Data
US 2019/0200381 A1 Jun. 27, 2019

Related U.S. Application Data

(60) Provisional application No. 62/335,280, filed on May 12, 2016.

(51) Int. Cl.
*H04W 72/14* (2009.01)
*H04L 1/16* (2006.01)
(Continued)

(52) U.S. Cl.
CPC .......... *H04W 72/14* (2013.01); *H04L 1/0061* (2013.01); *H04L 1/1664* (2013.01);
(Continued)

(58) Field of Classification Search
CPC ............ H04W 72/14; H04W 28/0278; H04W 72/0413; H04W 72/0446; H04W 80/02;
(Continued)

(56) References Cited

U.S. PATENT DOCUMENTS

| 2010/0111032 A1 | 5/2010 | Wu |
| 2011/0141928 A1 | 6/2011 | Shin et al. |

(Continued)

FOREIGN PATENT DOCUMENTS

| EP | 2802187 A1 | 11/2014 | |
| GB | 2548902 A * | 10/2017 | ............ H04W 72/14 |

(Continued)

OTHER PUBLICATIONS

"Open Issues for Skipping UL Grants", 3GPP TSG-RAN2 Meeting #93bis, R2-162909, Agenda item: 8.8.2, Qualcomm Incorporated, Apr. 12-16, 2016, 2 pages.

(Continued)

*Primary Examiner* — Hardikkumar D Patel
(74) *Attorney, Agent, or Firm* — Harrington & Smith

(57) ABSTRACT

Systems, methods, apparatuses, and computer program products for skipping TB transmission depending on UCI transmission are provided. One method includes receiving, by a UE, a configuration message from a network node. The configuration message may indicate to the UE a configuration of skipping uplink (UL) transmission when there is no uplink data. The method may then include determining whether the UE is requested for uplink control information (UCI) transmission for a subframe with UL grant. If it is determined that the UE is requested for UCI transmission, then the method may include generating and transmitting a transport block containing padding buffer status report (BSR).

20 Claims, 3 Drawing Sheets

(51) Int. Cl.
| | |
|---|---|
| *H04L 5/00* | (2006.01) |
| *H04W 72/12* | (2009.01) |
| *H04L 1/18* | (2006.01) |
| *H04L 1/00* | (2006.01) |
| *H04W 28/02* | (2009.01) |
| *H04W 72/04* | (2009.01) |
| *H04W 80/02* | (2009.01) |

(52) U.S. Cl.
CPC .......... *H04L 1/1671* (2013.01); *H04L 1/1812* (2013.01); *H04L 1/1854* (2013.01); *H04L 5/0044* (2013.01); *H04L 5/0053* (2013.01); *H04L 5/0064* (2013.01); *H04W 28/0278* (2013.01); *H04W 72/0413* (2013.01); *H04W 72/0446* (2013.01); *H04W 72/1284* (2013.01); *H04W 80/02* (2013.01)

(58) Field of Classification Search
CPC . H04W 72/1284; H04W 72/12; H04W 56/00; H04W 74/08; H04W 74/0833; H04W 28/06; H04W 72/1289; H04W 72/04; H04W 52/0209; H04W 72/1268; H04W 74/008; H04W 76/28; H04W 72/02; H04W 52/0216; H04W 52/02; H04W 52/365; H04W 72/1294; H04W 72/042; H04W 72/0406; H04L 1/0061; H04L 1/1812; H04L 1/1664; H04L 1/1671; H04L 1/1854; H04L 5/0044; H04L 5/0053; H04L 5/0064; H04L 1/0025; H04L 5/0007; H04L 27/3836; H04L 1/1829; H04L 1/1861; H04L 5/0055; H04L 1/0027; H04L 2001/125; H04L 5/00; H04L 1/003; H04L 1/0059; H04L 1/0073; H04L 1/1893; H04L 1/0057; H04L 1/0026; H04L 1/00; H04L 1/0009; H04L 1/0003; Y02D 70/00; Y02D 70/1262; Y02D 30/70
See application file for complete search history.

(56) References Cited

U.S. PATENT DOCUMENTS

| | | | |
|---|---|---|---|
| 2011/0310833 A1* | 12/2011 | Lee ................... | H04W 52/0209 370/329 |
| 2012/0230232 A1 | 9/2012 | Ji et al. | |
| 2013/0034028 A1 | 2/2013 | Chen et al. ................... | 370/280 |
| 2013/0136053 A1 | 5/2013 | Kim et al. | |
| 2014/0023055 A1 | 1/2014 | Jeong et al. | |
| 2015/0043352 A1 | 2/2015 | Jang et al. | |
| 2017/0311344 A1* | 10/2017 | Lee ................... | H04W 72/1289 |
| 2018/0006791 A1* | 1/2018 | Marinier ............... | H04L 1/0061 |
| 2018/0368176 A1* | 12/2018 | Sun ....................... | H04W 76/28 |

FOREIGN PATENT DOCUMENTS

| | | |
|---|---|---|
| KR | 2014/0043148 A | 4/2014 |
| RU | 2558733 C2 | 8/2015 |

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212, V13.1.0, Mar. 2016, pp. 1-129.

"3rd Generation Partnership Project; Technical Specification Group Radio Access Network; Evolved Universal Terrestrial Radio Access (E-UTRA); Physical layer procedures (Release 13)", 3GPP TS 36.213, V13.1.1, Mar. 2016, pp. 1-361.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814, V9.0.0, Mar. 2010, pp. 1-104.

International Search Report and Written Opinion received for corresponding Patent Cooperation Treaty Application No. PCT/FI2017/050343, dated Aug. 17, 2017, 16 pages.

"Report of 3GPP TSG RAN WG2 meeting #91", 3GPP TSG-RAN Working Group 2 meeting #91bis, R2-154032, Agenda Item: 2.2, ETSI MCC, Oct. 5-9, 2015, pp. 1-163.

"Skipping Empty BSR and Feedback for SPS Activation/Deactivation", 3GPP TSG-RAN WG2 Meeting #93bis, R2-162504, Agenda item: 8.8.2, Nokia, Apr. 11-15, 2016, 8 pages.

"Skipping Uplink Transmission With No Data to Transmit", 3GPP TSG-RAN WG2 Meeting #91, R2-153332, Agenda Item: 7.11, Samsung, Aug. 24-28, 2015, pp. 1-2.

3rd Generation Partnership Project;Technical Specification Group Radio Access Network; Evolved Universal Terrestrial Radio Access (E-UTRA);Medium Access Control (MAC) protocol specification (Release 13) 3GPP TS 36.321 V13.1.0, Mar. 2016, pp. 33-36, 48-50 and 56-59.

Office action received for corresponding Russian Patent Application No. 2018142220, dated Aug. 8, 2019, 8 pages of office action and 5 pages of translation available.

Office action received for corresponding Vietnam Patent Application No. 1-2018-05301, dated Jan. 8, 2019, pages of office action and 1 pages of office action translation available.

"Considerations on skipping UL padding transmissions", Sequans Communications, 3GPP TSG-RAN WG2 #93bis, R2-162735, Apr. 2016, 7 pages.

* cited by examiner

METHODS AND APPARATUSES FOR SKIPPING TRANSPORT BLOCK TRANSMISSION DEPENDING ON UPLINK CONTROL INFORMATION TRANSMISSION

RELATED APPLICATION

This application was originally filed as PCT Application No. PCT/FI2017/050343 on May 4, 2017, which claims priority from U.S. application 62/335,280, filed May 12, 2016.

CROSS-REFERENCE TO RELATED APPLICATIONS

This application claims priority from U.S. Provisional Application No. 62/335,280, filed on May 12, 2016. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-Advanced Pro, LTE-M, and/or 5G radio access technology. Some embodiments may relate to methods and apparatuses for possibly skipping transport block (TB) transmission depending on uplink control information (UCI) transmission.

Description of the Related Art

Universal Mobile Telecommunications System (UMTS) Terrestrial Radio Access Network (UTRAN) refers to a communications network including base stations or Node Bs, and, for example, radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support.

Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

$5^{th}$ generation wireless systems (5G) refers to the new generation of radio systems and network architecture. 5G is expected to provide higher bitrates and coverage as well as decreased latency than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage and further reduced latency as well as spectral and signaling efficiency.

SUMMARY

One embodiment is directed to a method that may include receiving, by a user equipment, a configuration message from a network node. The configuration message may indicate to the user equipment a configuration of skipping uplink transmission when there is no uplink data. The method may then include determining whether the user equipment is requested for uplink control information transmission for a subframe with uplink grant. In certain embodiments, if it is determined that the UE is requested for UCI transmission, then the method may include generating and transmitting a transport block regardless of whether there is uplink data to be transmitted.

Another embodiment is directed to an apparatus that may include at least one processor and at least one memory including computer program code. The at least one memory and the computer program code are configured, with the at least one processor, to cause the apparatus at least to receive a configuration message from a network node. The configuration message may indicate to the apparatus a configuration of skipping uplink transmission when there is no uplink data. The at least one memory and the computer program code may be further configured, with the at least one processor, to cause the apparatus at least to determine whether the apparatus is requested for uplink control information transmission for a subframe with uplink grant. In certain embodiments, if it is determined that the UE is configured for UCI transmission, then the at least one memory and the computer program code may be further configured, with the at least one processor, to cause the apparatus at least to generate and transmit a transport block regardless of whether there is uplink data to be transmitted.

Another embodiment is directed to an apparatus including receiving means for receiving a configuration message from a network node. The configuration message may indicate to the apparatus a configuration of skipping uplink transmission when there is no uplink data. The apparatus may also include determining means for determining whether the apparatus is requested for uplink control information transmission for a subframe with uplink grant. In certain embodiments, if it is determined that the UE is configured for UCI transmission, then the apparatus may include means for generating and transmitting a transport block regardless of whether there is uplink data to be transmitted.

Another embodiment is directed to a method that may include transmitting, by a network node, a configuration message for configuring at least one UE to skip uplink transmission when there is no uplink data. The method may then include receiving, from the at least one UE, a transport block for a subframe with uplink control information transmission regardless of the configuration for skipping uplink transmission for the at least one UE.

Another embodiment is directed to an apparatus that may include at least one processor and at least one memory including computer program code. The at least one memory and the computer program code are configured, with the at least one processor, to cause the apparatus at least to transmit a configuration message for configuring at least one UE to skip uplink transmission when there is no uplink data. The at least one memory and the computer program code may be further configured, with the at least one processor, to cause the apparatus at least to receive, from the at least one UE, a transport block for a subframe with uplink control information transmission regardless of the configuration for skipping uplink transmission for the at least one UE.

Another embodiment is directed to an apparatus that may include transmitting means for transmitting a configuration message for configuring at least one UE to skip uplink transmission when there is no uplink data. The apparatus may also include receiving means for receiving, from the at least one UE, a transport block for a subframe with uplink control information transmission regardless of the configuration for skipping uplink transmission for the at least one UE.

BRIEF DESCRIPTION OF THE DRAWINGS

For proper understanding of the invention, reference should be made to the accompanying drawings, wherein.

DETAILED DESCRIPTION

Figure 1:
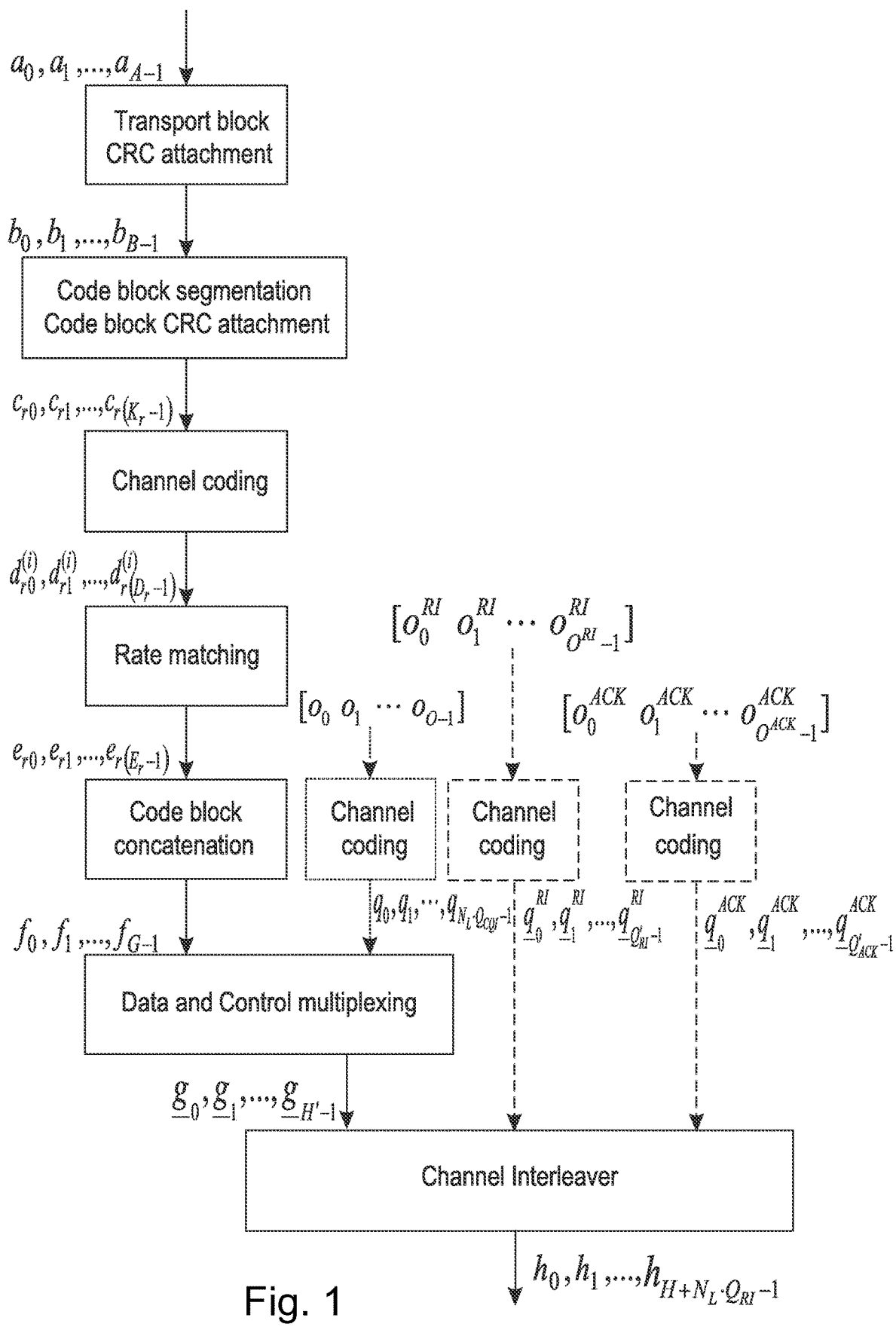
FIG. 1 illustrates a block diagram depicting Transport block processing for UL-SCH.

It will be readily understood that the components of the invention, as generally described and illustrated in the figures herein, may be arranged and designed in a wide variety of different configurations. Thus, the following detailed description of embodiments of systems, methods, apparatuses, and computer program products for skipping TB transmission depending on UCI transmission, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments relate to L2 latency reduction techniques for LTE. A Rel-14 work item (WI) on latency reduction was agreed in RAN #71 with the objective to specify L2 latency enhancements as identified in RAN2, which may include the introduction of short semi-persistent scheduling (SPS) period to allow uplink (UL) prescheduling, the reduction of padding in case of dynamic and SPS based UL pre-scheduling to reduce interference and UE power consumption, and further discussion on the introduction of feedback for SPS activation, reactivation and deactivation command.

According to an embodiment, the UE can be configured to skip UL transmission which only contains padding buffer status report (BSR) when there is no UL data in the buffer to be transmitted.

Currently, when there is Physical Uplink Shared Channel (PUSCH) allocation, UCI will be sent on PUSCH, multiplexed and interleaved with data according to 3GPP technical specifications (TS) 36.213 and 36.212. In 3GPP TS 36.213 section 7.2, it is specified that: "if a UE is not configured for simultaneous PUSCH and physical uplink control channel (PUCCH) transmission, it shall transmit periodic CSI reporting on PUCCH as defined hereafter in subframes with no PUSCH allocation . . . If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH."

In 3GPP TS 36.212, section 5.2.2 deals with the uplink shared channel (UL-SCH) and transport block (TB) processing for the UL-SCH. FIG. 1 illustrates a block diagram depicting Transport block processing for UL-SCH, as provided in FIG. 5.2.2-1 of 3GPP TS 36.212.

However, it is not clear how UCI is handled if there is no TB generated from the medium access control (MAC) layer. Therefore, currently, there is no resolution or approach for whether UCI should be sent on PUCCH or PUSCH when MAC does not generate a TB when it does not have UL data in the buffer.

In view of the above, an embodiment of the invention includes that, if skipping uplink transmission with only padding BSR is configured, for the subframe with UL grant and there is UCI transmission, MAC should generate the TB. In other words, the TB with padding BSR only is not skipped if the subframe is configured with periodic channel quality indicator (CQI), or aperiodic CQI requested for that subframe, or hybrid automatic repeat request (HARQ) feedback is to be sent on that subframe.

Alternatively, in another embodiment, if there is an UL grant and MAC does not generate TB because it does not have UL data to be transmitted, UCI is sent on PUSCH as if the grant is an UCI only grant following the description in 3GPP 36.212 section 5.2.4, even though the grant is intended for data with UCI.

According to yet another embodiment, if there is an UL grant and MAC does not generate TB because it does not have UL data to be transmitted, UCI is sent on PUCCH even if the UE has PUSCH allocation.

In one example embodiment, when the UE is configured with skipping UL transmission with only padding BSR and when no UL data: for the subframe with UL grant and UCI transmission (when there is periodic CQI configured in that subframe, or aperiodic CQI required for the subframe, or HARQ feedback is to be transmitted in that subframe), MAC always generates the TB even if it only contains padding BSR indicating Buffer status equals to 0. With this, there would be no impact to physical layer (PHY).

According to an embodiment, if MAC does not provide the TB when there is UCI transmission, PHY may need to generate some dummy data then mute them and send UCI only on the allocated PUSCH resource. Alternatively, the UL grant may be used to send UCI only following the description in 3GPP TS 36.212 section 5.2.4. This may require double decoding at the eNB side for UCI only and UCI with data on PUSCH, as well as some changes in PHY is expected to allow UL grant for data to be used for UCI only, as currently CQI only grant has specific format.

Another embodiment may include sending UCI on PUCCH when MAC does not generate any TB. This may require double decoding at the eNB though for UCI on PUCCH or UCI with data on PUSCH depending on whether there is UL data to be transmitted. Double decoding is likely already supported by eNB implementation to handle the case of PDCCH for UL grant lost. Some modifications to the 3GPP specification (e.g. 36.213) may be needed so that CQI on PUSCH or PUCCH should not be based on PUSCH allocation, but to allow it to be sent on PUCCH when MAC does not generate a TB.

Figure 2A:
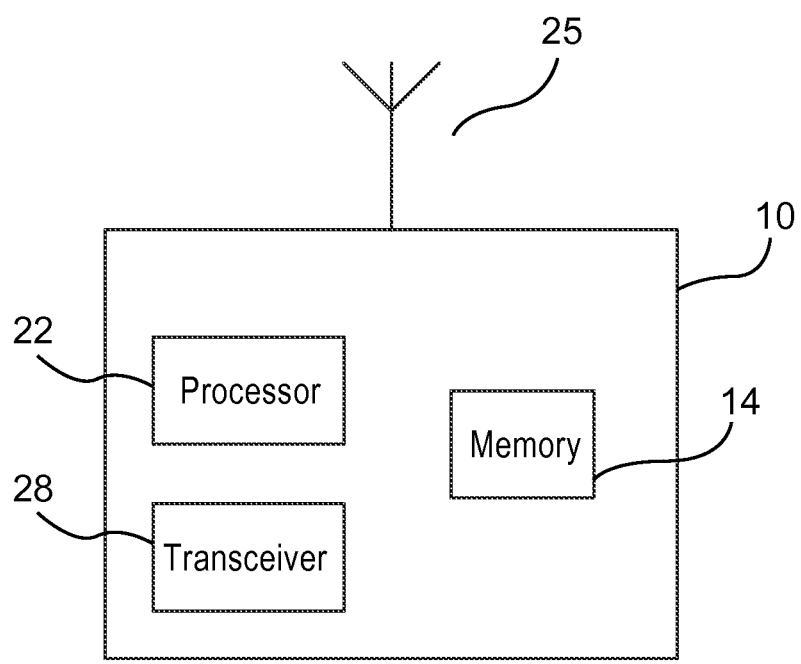
FIG. 2a illustrates a block diagram of an apparatus, according to an embodiment.

FIG. 2a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 2a.

As illustrated in FIG. 2a, apparatus 10 may include a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, or eNB, or an access node of 5G, for example. According to one embodiment, apparatus 10 may be controlled by memory 14 and processor 22 to perform the functions associated with embodiments described herein. For instance, in one embodiment, apparatus 10 may be controlled by memory 14 and processor 22 to configure one or more UEs to skip UL transmission when there is no UL data. For example, the configuring of the UE(s) may include apparatus 10 being controlled to transmit a configuration message indicating to the UE(s) to skip UL transmission when there is no UL data.

For each subframe/transmission time interval (TTI), apparatus 10 may be controlled by memory 14 and processor 22 to determine if there is UCI transmission in that TTI. If there is no UCI transmission in that TTI, apparatus 10 may be controlled by memory 14 and processor 22 to decode the PUSCH with data only or DTX detection when there is no UL transmission. If there is UCI transmission in that TTI, apparatus 10 may be controlled by memory 14 and processor 22 to decode the PUSCH as UCI with data TB.

Figure 2B:
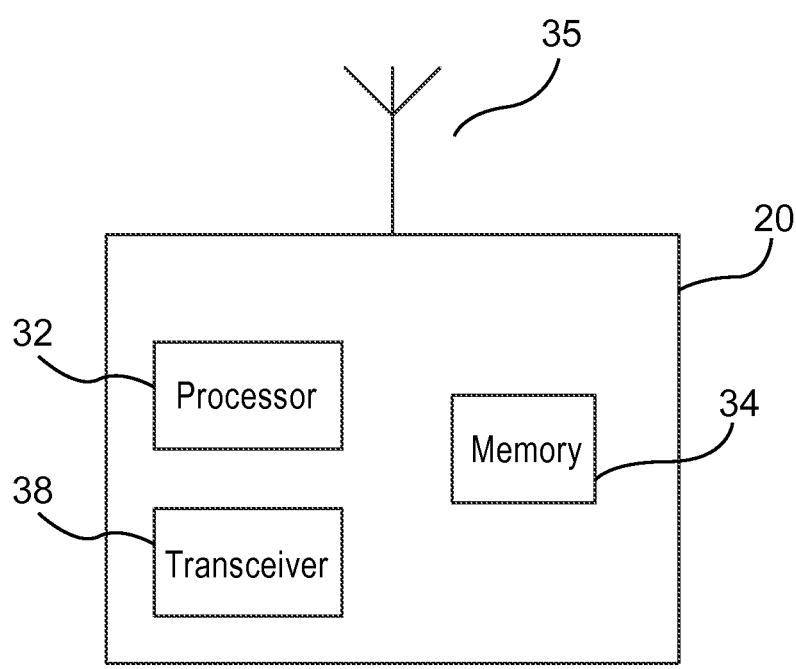
FIG. 2b illustrates a block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. It should be noted that one of ordinary skill in the art would understand that apparatus 20 may include components or features not shown in FIG. 2b.

As illustrated in FIG. 2b, apparatus 20 may include a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE. In this embodiment, apparatus 20 may be controlled by memory 34 and processor 32 to perform the functions associated with embodiments described herein. In one embodiment, apparatus 20 may be configured to skip UL transmission when there is no UL data. For example, according to an embodiment, apparatus 20 may be controlled by memory 34 and processor 32 to receive a configuration message, from a base station or eNB, to configure apparatus 20 to skip UL transmission when there is no UL data.

For each subframe/TTI, apparatus 20 may be controlled by memory 34 and processor 32 to check if there is UL data or MAC control element (CE) to be sent. If there is UL data or MAC CE to be sent, MAC generates the TB and it is delivered to PHY regardless of whether there is UL data to be transmitted. If there is no UL data or MAC CE to be sent, apparatus 20 may be controlled by memory 34 and processor 32 to check if there is UCI transmission in this TTI. If there is no UCI transmission in this TTI, generation of the TB is skipped and no TB is delivered to the PHY if there is no UL data to be transmitted. If there is UCI transmission in this TTI, MAC generates the TB and it is delivered to PHY.

Figure 3A:
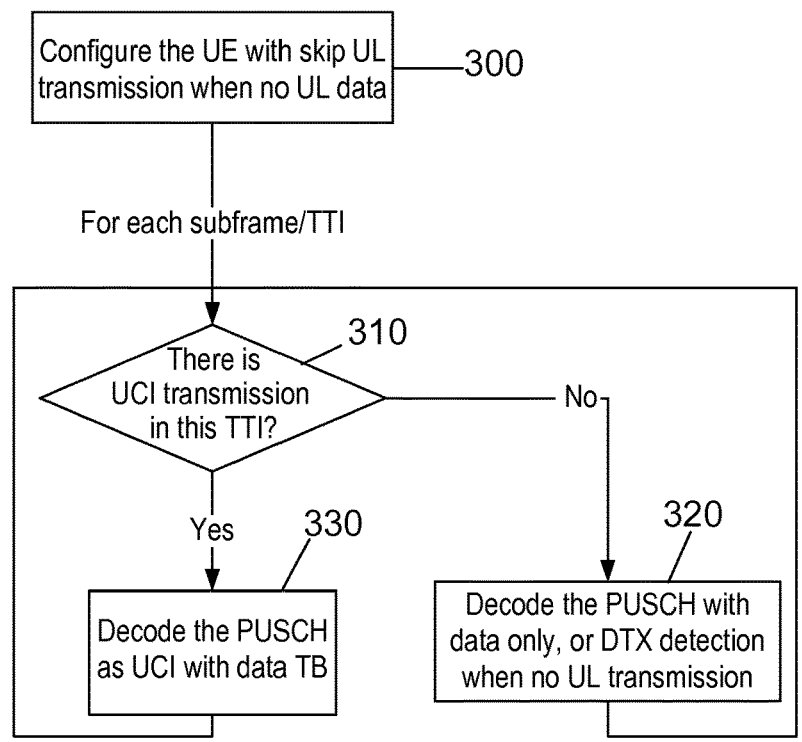
FIG. 3a illustrates a flow chart of a method, according to one embodiment.

FIG. 3a illustrates an example of a flow chart for a method, according to one embodiment. In certain embodiments, the method depicted in FIG. 3a may be performed by a base station or eNB, for example. As illustrated in FIG. 3a, the method may include, at 300, configuring one or more UEs to skip UL transmission when there is no UL data. For example, the configuring of the UE(s) may include transmitting a configuration message indicating to the UE(s) to skip UL transmission when there is no UL data. For each subframe/TTI, the method may include, at 310, determining or checking whether there is UCI transmission in that TTI. If there is no UCI transmission in that TTI, then the method may include, at 320, decoding the PUSCH with data only or DTX detection when there is no UL transmission. If there is UCI transmission in that TTI, then the method may include, at 330, decoding the PUSCH as UCI with data TB.

Figure 3B:
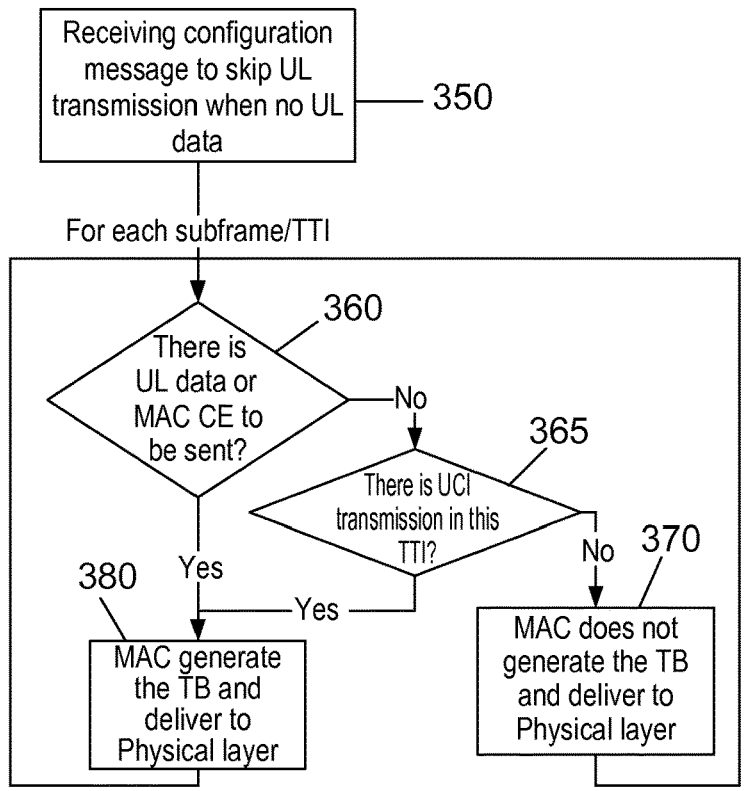
FIG. 3b illustrates a flow chart of a method, according to another embodiment.

FIG. 3b illustrates an example of a flow chart for a method, according to another embodiment. In certain embodiments, the method depicted in FIG. 3b may be performed by a mobile device or UE, for example. As illustrated in FIG. 3b, the method may include, at 350, receiving a configuration message, for example from a base station or eNB, indicating to skip UL transmission when there is no UL data. For each subframe/TTI, the method may include, at 360, checking or determining whether there is UL data or MAC control element (CE) to be sent. If there is UL data or MAC CE to be sent, the method may include, at 380, generating the TB and delivering it to PHY regardless of whether there is UL data to be transmitted. If there is no UL data or MAC CE to be sent, the method may further include, at 365, checking or determining whether there is UCI transmission in this TTI. If there is no UCI transmission in this TTI, the method may include, at 370, skipping generation of the TB and not delivering any TB to the PHY if there is no UL data to be transmitted. If there is UCI transmission in this TTI, the method may include, at 380, generating the TB and delivering it to PHY.

Embodiments of the invention provide several advantages and/or technical improvements. For example, the use of embodiments of the invention can result in latency reduction and power savings, thereby improving the functioning of communications networks and their nodes.

In some embodiments, the functionality of any of the methods, processes, or flow charts described herein may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine (s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One embodiment is directed to a method, which may be performed by a UE. The method may include receiving, by the UE, a configuration message from a base station or eNB. The configuration message may indicate to the UE a configuration of skipping UL transmission when there is no UL data. In response to receiving of the configuration message, the method may also include receiving (downlink) data/signal from the BS/eNB, and determining that the UE is configured/requested for periodic/aperiodic CQI or HARQ for a subframe with UL grant, regarding the received data/signal. Based on the determining, the method may also include generating a TB regardless of whether there is UL data to be transmitted and, consequently, not skipping padding BSR only protocol data unit (PDU). The method may also include transmitting the TB to the BS regardless of whether there is UL data to be transmitted.

Another embodiment is directed to an apparatus, which may include at least one processor and at least one memory including computer program code. The at least one memory and the computer program code may be configured, with the at least one processor, to cause the apparatus at least to receive a configuration message from a base station or eNB. The configuration message may indicate to the apparatus a configuration of skipping UL transmission when there is no UL data. In response to receiving of the configuration message, the at least one memory and the computer program code may be configured, with the at least one processor, to cause the apparatus at least to receive (downlink) data/signal from the BS/eNB, and determine that the apparatus is configured/requested for periodic/aperiodic CQI or HARQ for a subframe with UL grant, regarding the received data/signal. Based on the determining, The at least one memory and the computer program code may be configured, with the at least one processor, to cause the apparatus at least to generate a TB regardless of the whether there is UL data to be transmitted and, consequently, not skipping padding BSR only PDU. The at least one memory and the computer program code may be further configured, with the at least one processor, to cause the apparatus at least to transmit the TB to the BS regardless of whether there is UL data to be transmitted.

Another embodiment is directed to a method, which may be performed by a base station or eNB. The method may include transmitting a configuration message for configuring at least one UE to skip UL transmission when there is no UL data. The method may further include transmitting a data/signal to the at least one UE. The method may then include receiving a TB for the subframe with UCI transmission regardless of the skipping UL transmission configuration.

Another embodiment is directed to an apparatus, which may include at least one processor and at least one memory including computer program code. The at least one memory and the computer program code may be configured, with the at least one processor, to cause the apparatus at least to transmit a configuration message for configuring at least one UE to skip UL transmission when there is no UL data. The at least one memory and the computer program code may be configured, with the at least one processor, to cause the apparatus at least to transmit a data/signal to the at least one UE, and to receive a TB for the subframe with UCI transmission regardless of the skipping UL transmission configuration.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method comprising:
   receiving, by a user equipment, a configuration message from a network node, wherein the configuration message indicates to the user equipment to skip uplink transmission for an uplink grant when there is no uplink data; and
   determining whether the user equipment is requested for uplink control information transmission for a subframe with the uplink grant, wherein the uplink control information comprises an aperiodic channel quality indicator;

when it is determined that the user equipment is requested for the uplink control information transmission for the subframe with the uplink grant, generating a transport block even when there is no uplink data to be transmitted; and transmitting the generated transport block and the uplink control information to the network node in the uplink grant on a physical uplink shared channel.

2. The method according to claim 1, wherein, when it is determined that the user equipment is not requested for the uplink control information transmission for the subframe with the uplink grant and a protocol data unit is a padding buffer status report only protocol data unit, skipping generating a transport block.

3. The method according to claim 1, wherein the uplink control information further comprises at least one of: a periodic channel quality indicator and a hybrid automatic repeat request feedback.

4. The method according to claim 1, further comprising receiving the uplink grant from the network node.

5. An apparatus comprising:
at least one processor; and
at least one memory including computer program code, the at least one memory and the computer program code being configured, with the at least one processor, to cause the apparatus at least to:
receive a configuration message from a network node, wherein the configuration message indicates to the apparatus to skip uplink transmission for an uplink grant when there is no uplink data;
determine whether the apparatus is requested for uplink control information transmission for a subframe with the uplink grant, wherein the uplink control information comprises an aperiodic channel quality indicator;
when it is determined that the apparatus is requested for the uplink control information transmission for the subframe with the uplink grant, generating a transport block even when there is no uplink data to be transmitted; and
transmitting the generated transport block and the uplink control information to the network node in the uplink grant on a physical uplink shared channel.

6. The apparatus according to claim 5, wherein, when it is determined that the apparatus is not requested for the uplink control information transmission for the subframe with the uplink grant and a protocol data unit is a padding buffer status report only protocol data unit, the at least one memory and the computer program code are further configured, with the at least one processor, to cause the apparatus at least to skip generating a transport block.

7. The apparatus according to claim 5, wherein the uplink control information further comprises at least one of: a periodic channel quality indicator and a hybrid automatic repeat request feedback.

8. The apparatus according to claim 5, wherein the at least one memory and the computer program code are further configured, with the at least one processor, to cause the apparatus at least to receive the uplink grant from the network node.

9. The apparatus according to claim 5, wherein the apparatus comprises a user equipment.

10. A method comprising:
transmitting, by a network node, a configuration message for configuring at least one user equipment to skip uplink transmission for an uplink grant when there is no uplink data; and
receiving, from the at least one user equipment, a transport block comprising uplink control information in the uplink grant even when there is no uplink data to be transmitted in the uplink grant, wherein the uplink control information comprises an aperiodic channel quality indicator.

11. The method according to claim 10, wherein the uplink control information further comprises at least one of: a periodic channel quality indicator and a hybrid automatic repeat request feedback.

12. The method according to claim 10, further comprising transmitting the uplink grant to the at least one user equipment.

13. An apparatus comprising:
at least one processor; and
at least one memory including computer program code, the at least one memory and the computer program code being configured, with the at least one processor, to cause the apparatus at least to:
transmit a configuration message for configuring at least one user equipment to skip uplink transmission for an uplink grant when there is no uplink data; and
receive, from the at least one user equipment, a transport block for a subframe with comprising uplink control information in the uplink grant even when there is no uplink data to be transmitted in the uplink grant, wherein the uplink control information comprises an aperiodic channel quality indicator.

14. The apparatus according to claim 13, wherein the uplink control information further comprises at least one of: a periodic channel quality indicator and a hybrid automatic repeat request feedback.

15. The apparatus according to claim 13, wherein the at least one memory and the computer program code are further configured, with the at least one processor, to cause the apparatus at least to transmit the uplink grant to the at least one user equipment.

16. The apparatus according to claim 5, wherein the generated transport block comprises padded zeros multiplexed with the uplink control information.

17. The apparatus according to claim 13, wherein the transport block comprises padded zeros multiplexed with the uplink control information.

18. The apparatus according to claim 5, wherein the type of the uplink grant is a dynamic uplink grant.

19. The apparatus according to claim 5, wherein uplink data refers to uplink data from a medium access control layer.

20. The apparatus according to claim 5, wherein determining whether the apparatus is requested for uplink control information transmission for the uplink grant is based on receiving a request for the aperiodic channel quality indicator.

* * * * *